(12) United States Patent
Chandrasiri et al.

(10) Patent No.: US 8,776,183 B2
(45) Date of Patent: *Jul. 8, 2014

(54) NETWORKS

(75) Inventors: Pubudu Chandrasiri, Berkshire (GB); Bulent Ozgur Gurleyen, Berkshire (GB); Mats Naslund, Vallingby (SE); Annika Jonsson, Stockholm (SE); Christian Gehrmann, Lund (SE)

(73) Assignee: Vodafone Group PLC, Newbury, Berkshire (GB)

( * ) Notice: Subject to any disclaimer, the term of this patent is extended or adjusted under 35 U.S.C. 154(b) by 2420 days.

This patent is subject to a terminal disclaimer.

(21) Appl. No.: 10/580,297

(22) PCT Filed: Nov. 5, 2004
(Under 37 CFR 1.47)

(86) PCT No.: PCT/GB2004/004711
§ 371 (c)(1),
(2), (4) Date: Jun. 5, 2008

(87) PCT Pub. No.: WO2005/053266
PCT Pub. Date: Jun. 9, 2005

(65) Prior Publication Data
US 2009/0013380 A1 Jan. 8, 2009

(30) Foreign Application Priority Data

Nov. 19, 2003 (GB) .................................. 0326969.3
Apr. 22, 2004 (GB) .................................. 0408965.2

(51) Int. Cl.
H04L 29/06 (2006.01)

(52) U.S. Cl.
USPC .............. 726/4; 709/225; 709/245; 370/254; 370/401

(58) Field of Classification Search
None
See application file for complete search history.

(56) References Cited

U.S. PATENT DOCUMENTS

| | | | |
|---|---|---|---|
| 5,898,831 A | 4/1999 | Hall et al. | |
| 6,339,595 B1 * | 1/2002 | Rekhter et al. | ................. 370/392 |
| 6,606,706 B1 | 8/2003 | Li | |
| 6,954,790 B2 * | 10/2005 | Forslow | ........................ 709/227 |

(Continued)

FOREIGN PATENT DOCUMENTS

| | | |
|---|---|---|
| EP | 1343298 | 3/2003 |
| EP | 2386035 | 9/2003 |

(Continued)

OTHER PUBLICATIONS

Castel Luccia C. and Montenegro G.: "Securing Group Management in IPv6 with Cryptographically Generated Addresses". IETF Internet Draft, Jul. 2002, p. 4, p. 12, p. 13, p. 14 and p. 17.

(Continued)

Primary Examiner — Michael R Vaughan
(74) Attorney, Agent, or Firm — Workman Nydegger

(57) ABSTRACT

A Personal Area Network Security Domain (PSD) is formed between devices (142, 150, 152, 154 and 156). The PSD allows the sharing of data and/or resources between the devices within the PSD. The devices within the PSD are located remotely from one another. For example, communication between device (150 and 156) will be performed via mobile or cellular telephone network (120), the Internet (140) and mobile or cellular telephone network (126). Each network (120, 126) is provided with a PSD Hub, which enables an IPsec secure connection between the devices (150 and 156) to be established.

36 Claims, 9 Drawing Sheets

(56) References Cited

U.S. PATENT DOCUMENTS

| | | | |
|---|---|---|---|
| 7,099,319 B2* | 8/2006 | Boden et al. | 370/389 |
| 7,284,046 B1* | 10/2007 | Kreiner et al. | 709/223 |
| 7,307,990 B2* | 12/2007 | Rosen et al. | 370/392 |
| 7,356,329 B2* | 4/2008 | Willey et al. | 455/410 |
| 7,533,164 B2* | 5/2009 | Volz et al. | 709/223 |
| 7,746,851 B2 | 6/2010 | Chandrasiri et al. | |
| 2002/0002687 A1* | 1/2002 | Chantrain et al. | 713/201 |
| 2002/0132605 A1 | 9/2002 | Smeets et al. | |
| 2002/0165006 A1 | 11/2002 | Haller et al. | |
| 2002/0186698 A1* | 12/2002 | Ceniza | 370/401 |
| 2002/0191576 A1* | 12/2002 | Inoue et al. | 370/338 |
| 2003/0118002 A1 | 6/2003 | Bradd et al. | |
| 2003/0133451 A1 | 7/2003 | Mahalingaiah | |
| 2003/0165121 A1 | 9/2003 | Leung et al. | |
| 2004/0014422 A1* | 1/2004 | Kallio | 455/41.1 |
| 2004/0088542 A1* | 5/2004 | Daude et al. | 713/156 |
| 2004/0093492 A1* | 5/2004 | Daude et al. | 713/156 |
| 2005/0004968 A1* | 1/2005 | Mononen et al. | 709/200 |
| 2005/0193103 A1* | 9/2005 | Drabik | 709/221 |
| 2006/0179303 A1* | 8/2006 | Gurleyen et al. | 713/167 |
| 2008/0317036 A1* | 12/2008 | Chandrasiri et al. | 370/395.3 |

FOREIGN PATENT DOCUMENTS

| | | |
|---|---|---|
| EP | 2399474 | 9/2004 |
| GB | 2372910 | 9/2002 |
| GB | 2389743 A | 12/2003 |
| WO | WO 02/19585 | 3/2002 |
| WO | WO 02/43333 | 5/2002 |
| WO | WO 02/51093 | 6/2002 |
| WO | WO 02/082773 | 10/2002 |
| WO | WO 02/096018 | 11/2002 |
| WO | WO 03/077498 A1 | 9/2003 |

OTHER PUBLICATIONS

Harnet H. et al.: "Tunneled Group Secure Association Key Management Protocol". IETF Internet Draft, May 2003, p. 13, p. 20, p. 22 and p. 31.

Hardino T. and Weis B.: "The Multicast Security Architecture". IETF Internet Draft, Aug. 2003, p. 7, p. 9, p. 10, p. 11, p. 13, p. 18, p. 19 and figures 1, 3.

Neimeggers I.G. et al.: "From Personal Area Network to Personal Networks:" Wireless Personal Comm. 26, 2002 p. 175-176. Refer e.g. to abstract, text last chapter p. 177-middle p. 178 and fig. 1. Section 8, p. 182, two first chapters.

Smith M. et al.: Network Security Using NAT and NAPT Proceedings of IEEE International Conference on Networks, ICON, Aug. 27, 2002, pp. 355-360.

U.S. Appl. No. 10/579,697, filed Jul. 8, 2009, Office Action.

U.S. Appl. No. 10/579,697, filed Feb. 16, 2010, Notice of Allowance.

* cited by examiner

— PSD-Hub Enrolment Messages
‒ ‒ ‒ ‒ ‒ ‒ IP sec Tunnel Between PSD-Hubs
◄——► IP sec protected PSD-Member Traffic
— — — IP sec Tunnel Between PSD Member and the PSD-Hub

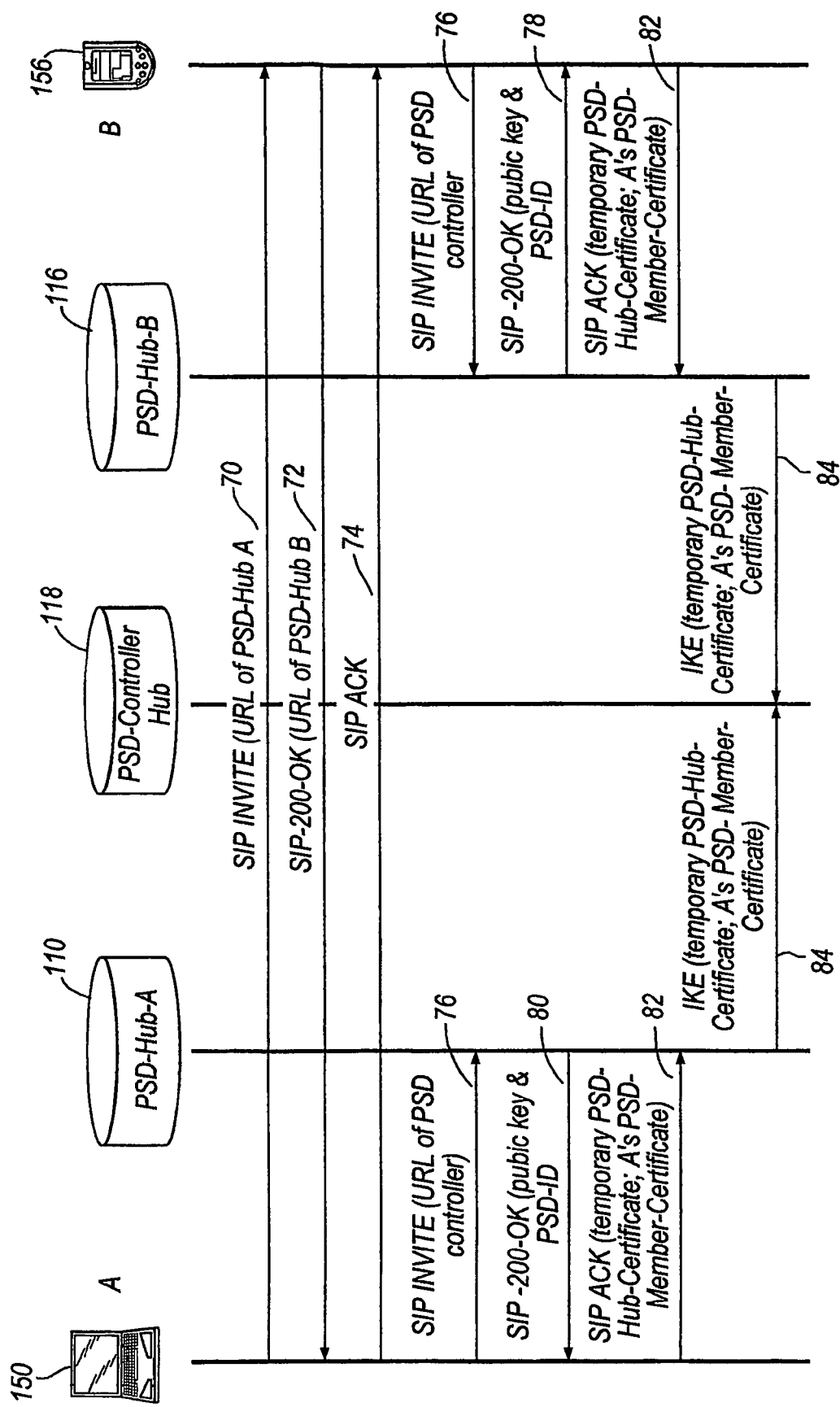

NETWORKS

TECHNICAL FIELD

The present invention relates to networks, and more particularly, but not exclusively, to the formation of a secure network to allow the transmission of data between remotely located devices.

BACKGROUND ART

In the area of secure group communications over the Internet, a problem exists to interconnect network devices that are situated behind network address translators (NAT) distributed across several Internet Service Provider (ISP) networks. Several devices can be served by a single NAT or a NAT may only serve one device. It is also possible for some devices to be connected directly to the Internet without a NAT. Each NAT can also be located in a different ISP network including cellular operators.

Regardless of the NAT configuration, devices connected to the Internet often wish to set-up secure channels between them. An Internet standard IPsec protocol is used to set-up secure IP communications between devices. IPsec is described in the following publication, which is hereby fully incorporated by reference: S. Kent: "Security Architecture for the Internet Protocol", IETF RFC 2401, November 1998. IPsec requires each device to be accessible through their known IP address. However, in the case of NATs the IP address used by the device is translated by the NAT to another IP address in order to increase the number of devices that can be served by a single IP Address. This issues posses even a bigger problem when several devices are served by a single NAT and scattered across different IP domains that may also served by NATs. The issue of using double or triple NATs limits the capabilities of such devices to securely connect to each other for the purpose of sharing resources.

Virtual Private Network (VPN) is a security solution to connect several devices over the Internet to another network usually a Local Area Network (LAN). It can also be used to secure communications between two individual devices. VPNs are usually implemented using the IPSec protocol and some security mechanism to authenticate the users. A VPN server authenticates the devices using a scheme like SecurIDs providing one-time passwords. After authentication, devices join the other network using some IP tunnelling mechanism. A new IP address is generally assigned by the VPN server in order for remote devices to have compatible IP addresses for the network they are joining. Generally VPNs connect individual devices that might be located behind NATs into a larger network that is owned by a company or an organisation. No specific group structure exists in the standard VPNs. Generally all employees of a particular organisation access the corporate LAN via VPN servers. Current VPN technologies do not support ad-hoc group formations and security mechanisms used in such groups. No mechanism exists to interconnect different VPN servers in different ISP networks. Current VPN technologies do not provide any mechanism to locate members of a group over the Internet and initiate secure communications between. Traditional use of VPN is initiated by the devices that wish to connect to the network that a VPN serves.

DISCLOSURE OF INVENTION

According to a first aspect of the invention, there is provided a system including a plurality of devices; administration means for allowing selected devices to be associated together as a group by providing each device with security data and identification data, the security data of each device being interpretable by each other device within the group, particular modes of communication only being allowed between devices within the group having such security data, and the identification data identifying each device within the group for the purpose of delivering data to that device but not necessarily being recognisable by other devices not in said group; and routing means having an external identifier recognisable by devices not in said group for routing communications via a communication medium and for communicating data originating from one device within said group received via said communication medium by means of the external identifier to another device within said group using the identification data.

According to a second aspect of the invention, there is provided a method of configuring an IP address to allow data exchange between a first device "A" and a second device "B" that are associated with one another in a group, the group having a group identifier "Group-ID", and each device having unique identifier "Group-Member-ID" within the group, and where the devices are coupled to one another for communication therebetween via respective communication hubs "Hub-A" and "Hub-B", the method including providing each of said devices with a unique IP address within said group According to a third aspect of the invention, there is provided a method of enabling communication between a plurality of devices, the method including associating selected devices together as a group by providing each device with security data and identification data, the security data of each device being interpretable by each other device within the group, particular modes of communication only being allowed between devices within the group having such security data, and the identification data identifying each device within the group for the purpose of delivering data to that device but not necessarily being recognisable by other devices not in said group; and routing data originating from one device within said group by routing means, having an external identifier recognisable by devices not in said group for routing communications via a communication medium, which communicates that data received via the communication medium by means of the external identifier to another device within said group using the identification data.

According to a fourth aspect of the invention, there is provided a routing node for enabling communication between a plurality of devices which are associated together as a group by providing each device with security data and identification date, the security data of each device being interpretable to each other device within the group, particular modes of communication only being allowed between devices within the group having such security data, and the identification data identifying each device within the group for the purpose of delivering data to that device but not necessarily being recognisable by other devices not in said group; wherein the routing node has an external identifier recognisable by devices not in said group for routing communications via a communication medium, and communicates data originating from one device within said group received via said communication medium by means of the external identifier to another device within said group using the identification data.

BRIEF DESCRIPTION OF DRAWINGS

For a better understanding of the present invention, embodiments will now be described by way of example, with reference to the accompanying drawings, in which:

FIGS. 10,11A and 11B show messages exchanged between the elements to establish a PSD.

MODES OF CARRYING OUT THE INVENTION

Figure 1:
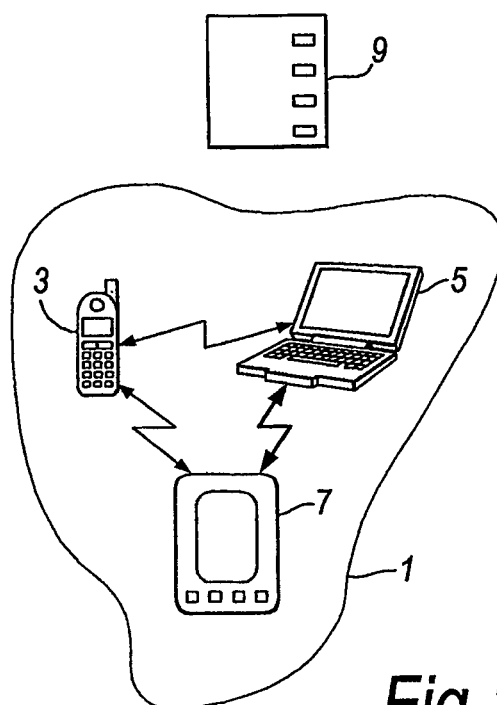
FIG. 1 shows a personal area network (PAN) including a plurality of devices belonging to one user.

FIG. 1 shows a personal area network (PAN) 1 including a plurality of devices belonging to one user. Within the PAN 1 it is desired that all the individual devices can communicate and share resources with other devices of the same user in seamless fashion. From a security standpoint, this requires individual devices to identify other devices owned by the same user when offering or requesting services. Further, in order to protect data confidentiality, individual devices should be able to communicate securely with each other. Depending on the number of devices within the PAN 1 and the services they offer, this can become very complicated. This problem is further complicated because the number of devices will be changing with time as devices join and leave the PAN 1.

A PAN is different from a conventional network in that communication between devices is not necessarily through a server.

If such a multitude of devices in a PAN are expected to have coherent behaviour, all devices should be able to fit into a distributed terminal architecture capable of taking into consideration the ownership and privileges required for individual devices to operate.

In FIG. 1 the devices in the personal area network 1 comprise a GPRS mobile telephone 3, laptop computer 5 and personal digital assistant (PDA) device 7. As indicated by the allows, each of the devices 3, 5, 7 is capable of communicating with the other devices within the PAN 1. In this example each of the devices 3, 5, 7 is a Bluetooth device, allowing the devices 3, 5, 7 to be inter-operable. Data communication between the devices 3, 5, and 7 may be by means of cables, or by infrared communication, radio communication or by any other wireless means.

For example, the PDA 7 will connect to the mobile telephone 3 to access the Internet and to the laptop computer 5 to synchronise the user's calendar or to exchange files for other reasons.

Conventionally, each pair of devices 3, 5 and 7 must be separately configured to communicate with each other. This will require three separate configuration processes, for example between the laptop 5 and the PDA 7, the laptop 5 and the mobile telephone 3 and the mobile telephone 3 and the PDA 7. After an initial configuration processes the devices 3, 5, 7 may communicate with one another, although typically this will require the user to manually select a communication mode on each of two devices to communicate with one another. The devices may be configured to require the user to enter a personal identification number (PIN) before data exchange between a pair of devices can begin in order to, for example, prevent an unwanted device being substituted for one of the devices 3, 5 and 7 and obtaining or over-writing data from a device within the PAN 1.

In such a PAN 1, if it is desired to add a further device, such as MP3 player 9, it will be necessary to configure separately each of the devices 3, 5, 7 within the PAN 1 to communicate with the MP3 player 9. It will be appreciated that, as the number of devices within the PAN 1 increases, the addition of a new device to the PAN 1 requires an increasing number of configuration steps. For a conventional PAN having n components, $n*(n-1)/2$ component associations must be performed to form the PAN.

Advantageously, a group of devices within a PAN form a PAN Security Domain (PSD), as described in United Kingdom patent publication GB2389743 (Vodafone Group plc). A PSD is a group of components inside a PAN where each component can be authenticated, trusted and securely communicated with by means of some common security association. This reduces the number of component association procedures required.

In a PSD one device has the role of a PSD administrator or controller. This device includes security data (for example a shared key or a public-private key pair) that can be selectively passed to other devices that are to join the PSD. Communication can only successfully occur between devices that have this security data. Once a device has the security data, it can communicate with other devices in the PSD without necessarily referring to the PSD administrator. When a device is added to the PSD the PSD administrator advises each device of the addition of a new device to the PSD. If there are n devices in the PSD this requires n−1 inter-device communications. It is not necessary for the new device to separately pair or associate itself with each other device in the PSD.

The security association could be in the form of a shared secret key or a shared group key based on public key techniques, with a mutual "trust" being established between the devices by a personal certification authority (CA) within the PSD. Certificates issued to all PSD members indicate the device is a member of that PSD. The group key is not used for secure bilateral communications in the PSD, which takes place using bilaterally established keys—KAB allowing secure bilateral communication between devices A and B, KBC allowing secure bilateral communication between devices B and C, and KAC allowing secure bilateral communication between devices A and C—(discussed further below). The group key is used only for proof of PSD membership, secure PSD-wide broadcasts and PSD-wide secure communications.

The initial decision as to whether a device can be part of a PSD or not will be on user judgement followed up by positive authentication of the device based on a public key infrastructure (PKI) trusted root certificate. Alternatively, another known authentication method could be used.

One device within the PSD is nominated as the PSD administrator. The PSD administrator is a role that could be assumed by any of the devices in the PSD provided it contains the necessary hardware to support the role, for example a secure key store and/or a display. The administrator role may be moved from one device to another. If the administrator role is moved to a new device, the new device will have passed thereto, or have pre-stored thereon, the necessary security data to allow the admission of new devices to the PSD.

The PSD administrator also is responsible for configuring and managing the policies (described below) governing the devices in the PSD. Additionally it is responsible for enrolling new members in the PSD. The PSD administrator could also contain the personal CA that is responsible for issuing certificates to the PSD members. Advantageously, the PSD administrator will be the device with the greatest processing power and the best user interface. In a PSD based on the PAN 1 of FIG. 1, the administrator is laptop 5.

When a single user owns all devices in a PSD and treats them equally, such a configuration of devices will not contain any restrictions based on the identity of a device. All shared resources will be made available to all the PSD member devices. In other words, there is group "trust" between the devices. If a device is a member of the PSD, the other devices will assume that the devices can be trusted and communicated with. There is no need for each device to set up an individual trust relationship with each other device, in contrast to a conventional PAN as described above. Provided that the device is admitted to the group by the PSD administrator, the other devices will assume that the newly-admitted device can be trusted.

Figure 2:
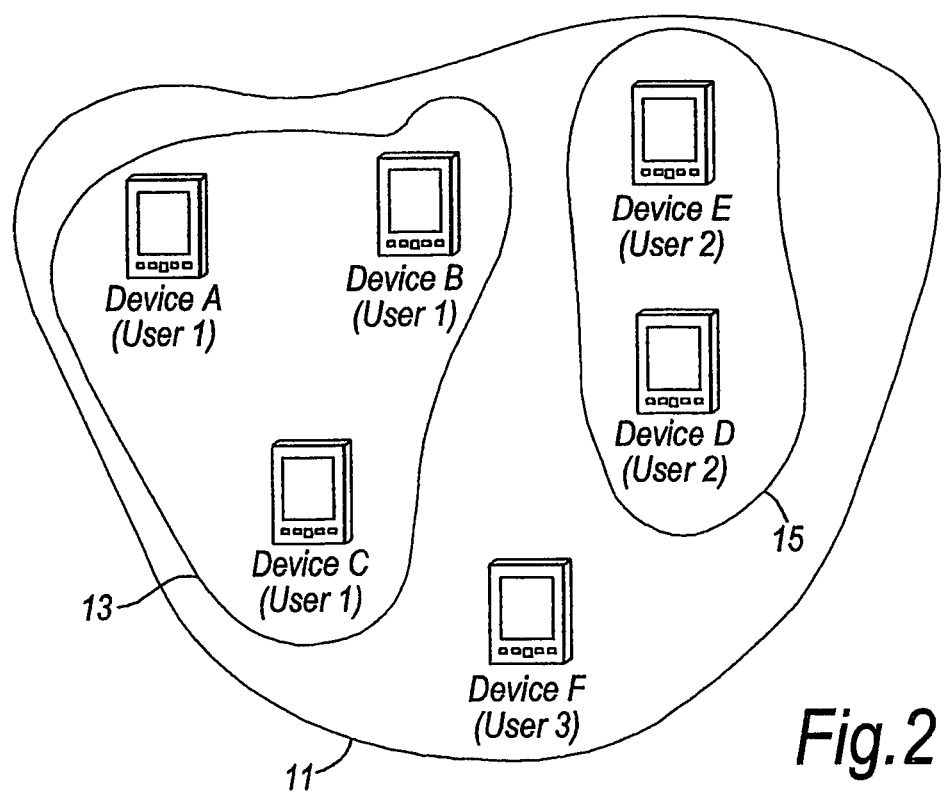
FIG. 2 shows a personal area network (PAN) having two PAN Security Domains (PSDs) formed therein.

FIG. 2 illustrates a PAN 11 containing six devices, designated A to F. The devices shown in FIG. 2 are all PDAs but it should be understood that they could be other types of device, or a combination of different devices, as in FIG. 1. Devices A, B and C are owned by the same user (user 1) while D and E are owned by another user (user 2). A third user (user 3) owns device F. All these devices are capable of communicating with other using their local interfaces.

A first PSD 13 includes devices A, B and C. These devices will be able to share resources and communicate with each other securely. A second PSD 15 includes devices D and E. Again, these devices will be able to share resources and communicate with each other securely.

If membership of one PSD is limited to devices, such as devices A, B and C, from a single user, two users will not be able share any resources. Sharing of resources could be achieved if the existing PSDs are configured so that device sharing between the PSDs is possible.

One way for the two users to share resources is to establish a new PSD. Depending on the situation, this PSD could be a temporary or a permanent PSD including the devices with the resources required to be shared.

Figure 3:
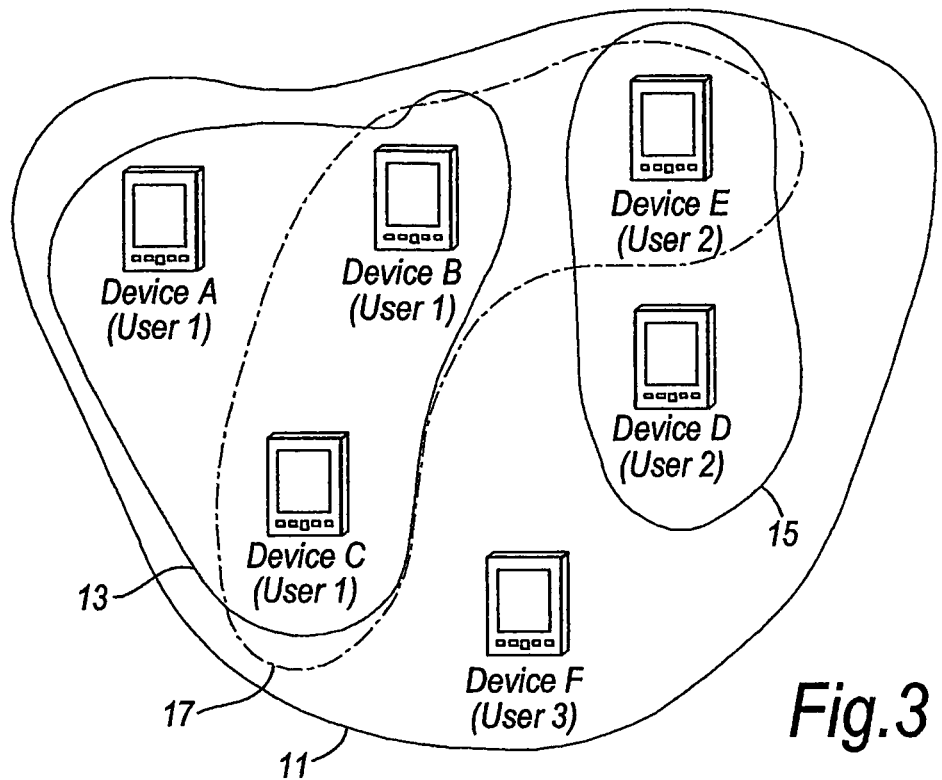
FIG. 3 shows the formation of a further PSD in the PAN of FIG. 2.

FIG. 3 shows a new PSD 17 formed between devices B, C and E. This will require a security association between two devices belonging to users 1 and 2. This association does not have to be between the very same devices that are going to be part of the new PSD. The original PSD could transmit the necessary data to introduce the new device to the PSD to all its member devices. Alternatively, the users 1 and 2 could pair two devices (one from each user) and then add further devices as required using one of the original devices as the PSD administrator.

When forming a PSD with devices from different users, it is not always straightforward to assign a PSD administrator. It might have to be mutually agreed by all parties in the PSD. Alternatively, the device that initially created the PSD could assume this role. Nevertheless, if required it could be handed over to another device in the PSD.

Each user can then configure their device policies to share the required resources with the members of the newly formed PSD.

User 1 will configure the policy on B and C while user 2 will do the same for E. Individual devices could contain a number of built in or preset configurations that could be activated by the user for different PSDs.

If required a PSD could also be used to establish different groups within a set of devices owned by the same user.

In addition to the temporary PSD between user 1 and user 2, either of them could establish another PSD to share resources with user 3. In order to keep the PSD concept simple, user 2 cannot use one of his devices, say E to establish a PSD between user 1 and 3, i.e. E cannot bridge the trust between the two different PSDs. Nonetheless, this could be achieved if E used as a PSD administrator to form a PSD involving devices from user 1 and user 3.

Figure 4:
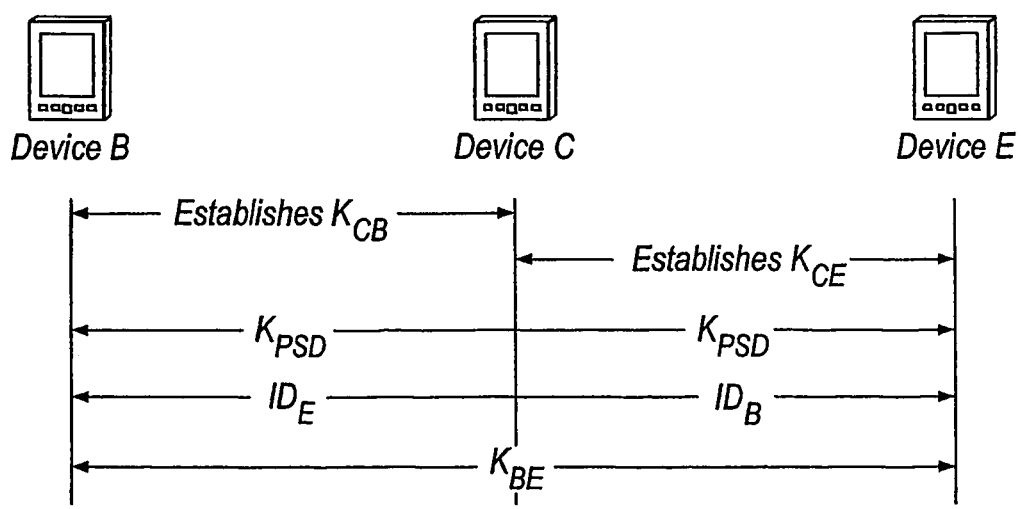
FIG. 4 shows the exchange of data between devices within a PSD.

The formation of a PSD between devices B, C and E, with identifiers IDB, IDC and IDE respectively, will now be described in more detail, with reference to FIG. 4. In order for these devices to form a PSD, two security associations between the three devices are needed. For example, these could be {B, C} and {C, E}. Based on these associations, it is possible for B and C, and C and E to communicate securely. Device C performs the role of PSD administrator. C then generates a group PSD membership key KPSD and communicates this to each of the devices. C then communicates the identifiers of all PSD members to each other, i.e. forwards IDB and IDE to E and B respectively. Together with KPSD, B and E are now in a position to generate a further key KBE to allow secure communications between them. FIG. 4 of the drawings shows the exchange of data between devices.

Alternatively, device C can have the role of a personal CA and issue B and E with certificates to carry out the above key exchanges using a local PKI. The possession of this certificate is equivalent to having access to KPSD, i.e. its proof of membership in the PSD.

However, forming a PSD itself does not impose any behaviour patterns or rules on the individual devices themselves. These must be achieved through a suitable "policy". This policy will set guidelines on behaviour and dictate how resources should be used and how the device should behave under different circumstances.

PSD policy can be used to enforce restrictions on any of the following:
a. Available resources.
b. Requirements for joining the PSD as a member.
c. Requirements to assume the role of the PSD administrator.
d. User interaction.
e. Usage of chargeable services.
f. The ability to install new applications.

Devices from more than one user may be PSD members.

The PSD policy file is in a standardised format to achieve interoperability between devices and it contains information about the resources available to different devices depending on the PSD to which they belong. All the resources listed in the file do not have to be available to the PSD all the time. These entries can be for future use when the resource is available to the PSD.

Each device has its own version of the policy file that states which resources are available from that particular device to the rest of the PSD members. Hence the policy file for two devices with different resource commitments to the PSD will differ. Devices may update or modify this as and when resources are either added to the PSD or removed from the PSD. Alternatively, the device might rely on the PSD administrator to do this on the devices behalf.

Depending on the access control mechanism it might be required to the store the policy file locally on a device. Nevertheless it is possible for a device to enquire and obtain policy information from a trusted device. It is not required for this trusted device to be a member of the same PSD.

The significance of each entry in a device policy is explained below.

| Resource Type & ID | Target ID | Authorisation ID |
|---|---|---|
| GPRS | C | |
| ... | ... | ... |

An Example PSD Policy File
Resource Type & ID

This contains information about the ID of the resource and its type. The ID is required to uniquely identify the resource within a component. The type of the resource is important when enforcing "Permissions Types" (discussed below) applicable to a resource.

Different resources on a component can be divided into four broad functional areas depending on their impact on the hosting component and its user.
1. Local Services—Printers, projectors, etc.
2. Network Interfaces—GSM, GPRS, BT, IrDA, WLAN, etc., or similar resources related network connectivity
3. Personal Information Management—Calendar, Phonebook, Location information etc., which are of personal value and will have privacy issues associated with them.
4. Executables—refers to code downloaded from another component on to the target device.

The above is merely an example of resources.
Target ID

Uniquely identifies within the PSD the component where the resource is located. It is useful to identify resources within the PSD when the resource is available from more than one component in the PSD.
Authorisation ID PSD members preferably have access to all PSD resources that have been made available by the policy file. If the PSD relies on a PSD administrator to access PSD resources, then the Authorisation ID should be the ID of the component assuming the role of the PSD administrator. If the component is to have the autonomy to authorise other components access to its resources, then the Authorisation ID is the same as the Target ID. When there are devices from more than one user, it is likely that the devices will retain the ability to authorise themselves without having to rely on a PSD administrator.

Figure 5:
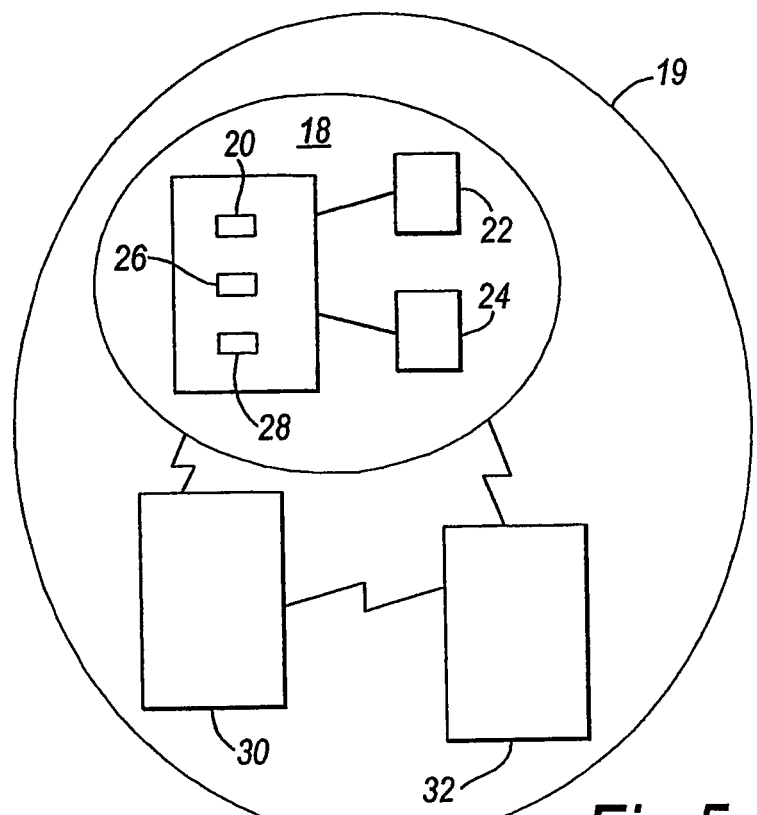
FIG. 5 shows a PSD, including the structure necessary for resource sharing within the PSD.

FIG. 5 shows a device 18 within a PSD 19. The device includes PSD policy instructions (PP) 20, storing the PSD policy data described above.

The device 18 has associated therewith resources 22 and 24, which may be useful to other devices 30 and 32 within the PSD 19. For example, if the device is a laptop computer, such resources may be the LCD display and a printer, and, if the device is a mobile telephone, the resources may be SMS transmission/reception and the personal telephone book stored on the mobile telephone. It should, of course, be understood that these are merely examples of devices and resources.

The device 18 also includes component policy instructions (CP) 26. These instructions control the allocation of resources 22, 24 to local requests, i.e. requests from the device 18 itself. These instructions control use of local resources in a generally conventional manner, and have a very similar function to the security policy used in the MIDP 2.0 standard.

The device 18 further includes component PSD profile instructions (CPP) 28. These instructions control the use of resources 22 and 24 by the other devices 30 and 32 in the PSD 19. If the device 18 is a member of more than one PSD, it will have more than one set of PSD policy instructions and more than one set of component PSD profile instructions. However, for the sake of simplicity, in the present example, the device 18 is a member of only one PSD, PSD 19.

It will generally be desired that (although the invention is not so restricted) any restrictions in the component policy instructions 26 to use of resources 22, 24 in response to local requests will also be applied to requests of other members 30, 32 of the PSD 19. Therefore, the component PSD profile instructions 28 will include the restrictions of the component policy instructions 26.

In addition, typically the component PSD profile instructions 28 will impose further restrictions on use of the resources 22, 24 by the other devices 30, 32 of the PSD 19. For example, if the device 18 is a GPRS mobile terminal, the component PSD profile may allow the mobile terminal to be used as a modem for downloading data to the devices 30, 32, but may restrict the maximum quantity of downloaded data to 500 KB in any given period—for example 24 hours. If further requests for data downloading are received from the devices 30, 32, the component PSD profile instructions 28 may be configured such that the user of the device 18 receives a (visual and/or audio) prompt from the mobile terminal indicating that a further request for data download has been made, seeking authorisation from the user of the device 18 for this further data download. For example, the component PSD profile instructions 28 may also allow access to the personal telephone book stored on the mobile terminal, but may not permit access to the SMS messages stored on the mobile terminal.

It should be understood that these are merely examples of resource sharing. The component PSD profile instructions 28 can be configured to prohibit or allow sharing of any resources provided by the device 18. The component PSD profile instructions 28 will also set any limitations on use of resources—such as limiting the amount of use or requiring a user prompt for authorisation of resource use. Of course, components 30 and 32 will include their own resources that may be shared by device 18 within the PSD 19, and will include PSD policy instructions, component policy instructions and component PSD profile instructions. However, these are not shown in FIG. 5, for the sake of simplicity.

Figure 6:
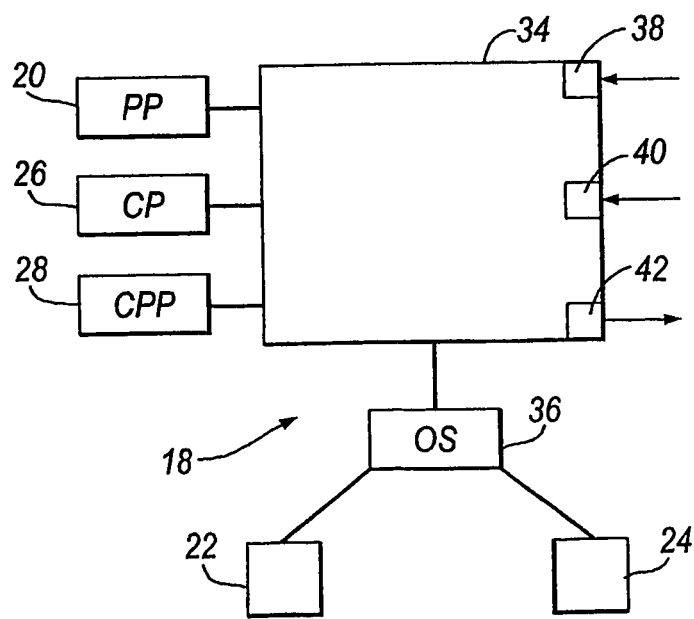
FIG. 6 shows in more detail the structure for resource sharing within a device of a PSD.

The arrangement of the device 18 is shown in more detail in FIG. 6. A security framework 34 controls access, via operating system 36, to resources 22 and 24.

The security framework includes first input port 38 which receives local requests (i.e. requests by the device 18) for use of resources 22 and 24. On receipt of such a request, the security framework 34 interrogates the component policy instructions 26 to determine the allowability of the resource request. If the resource request is allowed, or conditionally allowed, the resource request, with the appropriate conditions, is passed to operating a system 36, which allows the appropriate usage of the resources 22, 24.

The security framework 34 also includes input port 40 for receiving resource requests from other devices 30, 32 within the PSD 19. The procedure on receipt of their request for use of a resource 26, 25, from another device will be described further below in relation to FIG. 7.

The security framework 34 further includes an output port 42 for passing requests for use of external resources to other devices 30, 32 within the PSD 19. The operation of the PSD 19 with respect to such a request will be understood from the following discussion in relation to FIG. 7.

Figure 7:
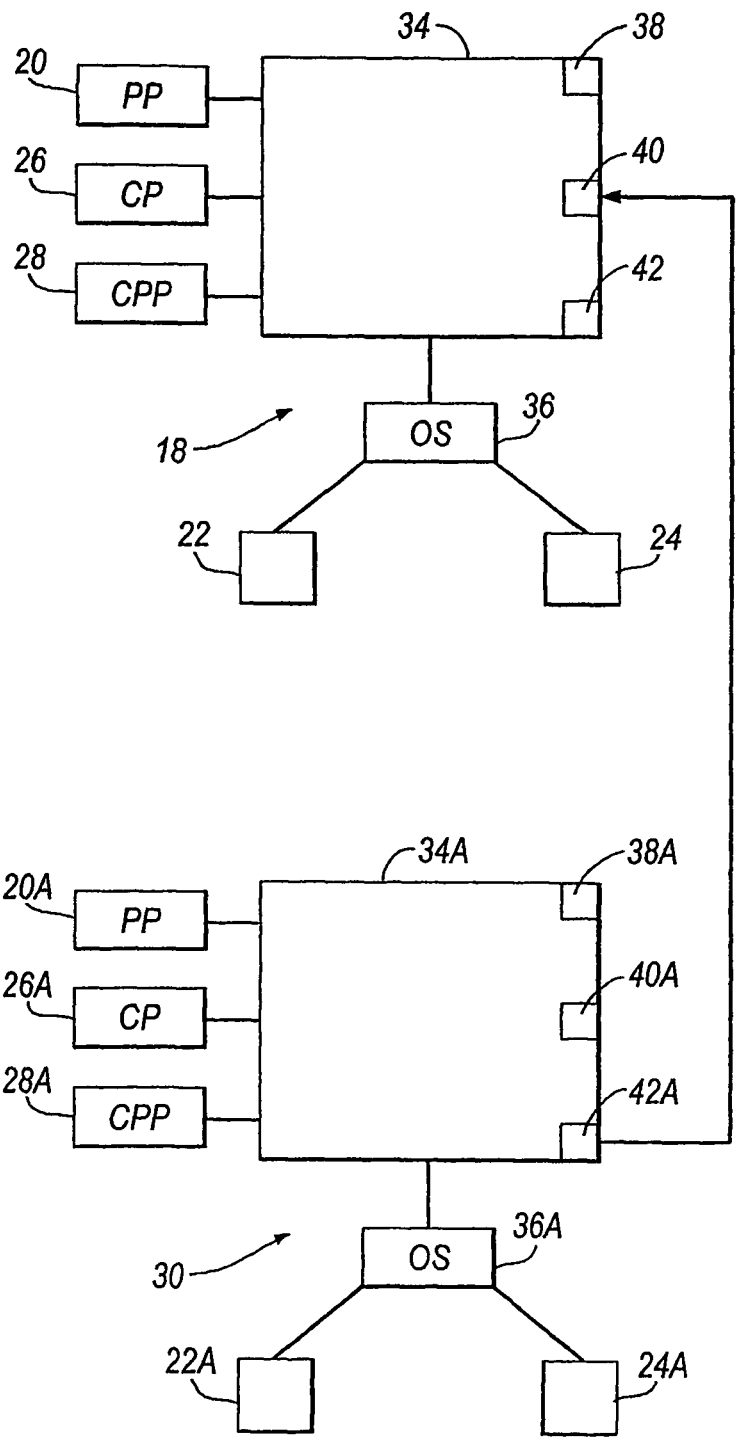
FIG. 7 shows the interaction between two devices within a PSD between which resource sharing is to occur.

FIG. 7 shows the operation of the PSD 19 when device 30 wishes to make use of resource 22 of device 18. As is shown in FIG. 7, device 30 includes a structure similar to device 18 for dealing with resource sharing within the PSD 19. In FIG.

7 elements of device 30 which correspond to similar elements of device 18 are designated the with same reference number suffixed with "A".

In the FIG. 7 example, device 18 is a laptop computer and resource 22 is a printer. Device 30 is a mobile telephone and resource 24A is a store of SMS messages. The user of device 30 wishes to print an SMS message from store 24A.

The operating system 36A of device 30 passes the relevant SMS to security framework 34A together with a message that it is desired to print the SMS message. The security framework 34A consults the PSD policy instructions 20A, which includes a list of resources available within the PSD 19. In the examples shown, the PSD policy instructions 20A will indicate that device 18 includes printer resource 22. The SMS message, together with instructions to print this message are passed to device 18 via output port 42A of device 30 and input port 40 of device 18. This data will be encoded in the manner described above, using the key as described.

The security framework 34 of device 18 decodes the received data at port 40. The security framework 34 then consults component PSD profile instructions 26 to determine whether the resource request should be allowed. If the resource request is allowed, the request is passed to the resource (printer) 22 via operating system 36.

Each device within a PSD may be equally trusted, i.e. all devices within a PSD will have access to the same information and resources. Alternatively, devices within a PSD may have different "privileges", that is one device may be able to access information and resources that another device within the PSD is prevented from accessing. For example, a PSD may include two personal computers, PC A and PC B. These personal computers could be configured so that only PC A has access to the PSD user's e-mails (which could be stored on PC A or elsewhere). Such restrictions (or privileges) to the access of information within the PSD could be held on the policy file for that PSD). It is preferred that the restrictions or privileges can be changed within a PSD, as required. This will typically be performed under control of the PSD administrator.

The advantages of a PSD so far described include:
- It is not necessary for a new PSD member to share security associations with all existing PSD members to establish trusted communications with them. For example, if device D joins an existing PSD of A, B and C, which is defined by group key, KABC. Once D has been authenticated by A (the PSD administrator), and a bilateral communication key KAD established, A can send KABC to D under the protection of key KAD. D can then prove PSD membership with this and establish further bilateral secure communication keys with B and C.
- Reduction in the user interaction required as the number of imprinting events is reduced. For a PSD of n components, only n−1 imprinting sessions are necessary, compared to n(n−1)/2 in a conventional PAN without the PSD concept
- Use of the device with the best user interface for the PSD administrator for enrolling new members allows the most user friendly imprinting protocols to always be used
- Use of a PSD administrator with revocation checking facilities allows revocation checks to be performed when new devices with certificates are enrolled
- Consistent resource information across all devices
- Resources can be shared with other users without having to compromise interactions between one's own devices
- Designation of group roles:
    - Designation of a single device to perform the role of a gateway between all PSD devices and external devices.
    - Designation of devices to perform specialised tasks, for example calendar synchronisation, revocation checking
- Use of the shared security associations to perform secure broadcast
- A device can be nominated by the user to perform administrative tasks on his behalf, i.e. the PSD administrator
- Establishes another layer of security on top of link layer security
- Different PSDs can be created for different trust groups within a PAN to solve particular access control problems.

The PSD concept described above is applicable to networks other than PANs. The devices in the network (and domain) may be separated by large distances.

Devices could be manufactured or pre-configured to enrol in certain PSDs automatically. For example, a mobile telephone could be configured so that when it comes within communication range of a particular PSD it automatically enrols in that PSD. Where such automatic enrolment is provided, generally the exchange of data between devices in the PSD will be restricted to prevent private information being disclosed to other devices in the PSD.

For example, a PSD could be arranged by a train operating company that automatically enrolled appropriately programmed mobile telephones at a station so that train running information can be transmitted to the telephone for use by the user.

In the PSD arrangements described above each device within the PSD is capable of direct communication with each of the other devices in the PSD. For example, that communication may be via a cable connection between the components of the PSD or, more likely, by a wireless link, such as a Bluetooth link, an infra red link or any suitable radio link. The communication medium is provided particularly to allow direct communication between the devices. It can be considered as "private" or "local". Typically (although not necessarily) for these types of communications to be feasible the devices within the PSD will be located within the vicinity of each other. For example, the devices may be in the same room or in the same building. Such devices are hereinafter referred to as "local" members of the PSD and such communications are referred to as "local" communications.

There are circumstances where the user may wish to take one or more devices which are members of their PSD to a remote location (that is, a location which is not "local" and by means of which the "local" communication between the PSD components is not feasible) but may still wish to access other devices within the PSD. For example, a user may take his mobile telephone and PDA when travelling abroad and may wish to access their PC based at their home—possibly to synchronise data between the PDA and the home PC or to print a document using a printer connected to the PC.

It is not possible for direct communication to occur between the PDA and the home PC by means of the local communication media described above (because the PDA and the home PC are now in different countries).

Alternatively, the devices that are members of a PSD may belong to different users, who will often be in different locations to one another. In such a circumstance, it will also not be possible for direct communication to occur between the devices by means of a local communication medium.

As described above, when a device joins the PSD for the first time it will typically (although not necessarily) do this by means of a local communication with the PSD administrator. At that time an identifier that is unique within the PSD to the new device is assigned to the new device, hereinafter referred to as a PSD-member-ID. The PSD-member-ID allows communications to be addressed to that device so that they can be successfully delivered thereto. The PSD-member-ID may be any suitable identifier. For example, it could be the Media Access Device address (MAC address) or the Bluetooth address of the device (if local communication is by Bluetooth). Alternatively, a local IP address may be assigned to each device by the PSD administrator, or a unique (within the PSD) 64 bit random number.

In addition to the PSD-member-ID, each device will have a PSD member certificate comprising a public key portion, a secret key portion and other relevant information.

Although the PSD-member-ID allows each device to be identified within the PSD when communicating via the local communication network, the PSD-member-ID does not allow satisfactory addressing of communications via other communications media, such as the Internet.

The embodiment now to be described solves this problem by creating a virtual local network served by devices referred to as a 'PSD Hub' for all devices that wish to communicate based on a PSD group association.

A PSD Hub creates an overlay network that is only accessible by the members of the same PSD. All communications to the PSD Hub are secured using the security associations (based on the PSD member certificate and/or other security data, such as a shared secret key) created during the PSD formation, and the IPSec protocol. PSD Hubs can be interconnected to serve clients that are located over different ISPs if the PSD Hub itself is located behind a NAT. If the PSD Hub is located on the Public Internet then one PSD Hub can serve several devices located between multiple NATs. This embodiment is designed for IPv4 based Internet. Some modifications are required to implement the same invention for IPv6 Internet, The third generation partnership project (3GPP) has recently defined a new concept known as IMS (IP—based Multimedia Subsystem). The aim of IMS is to allow users such as mobile telephone network operators to provide services to their subscribers as efficiently and effectively as possible. For example, the IMS architecture is likely to support the following communication types: voice, video, instant messaging, "presence" (a user's availability for contact), location-based services, email and web. Further communication types are likely to be added in the future. This diverse collection of communication devices requires efficient session management due to the number of different applications and services that will be developed to support these communication types. The 3GPP have chosen Session Initiation Protocol (SIP) for managing these sessions. SIP is described in the following publication, which is hereby fully incorporated by reference: J. Rosenberg, et al, "SIP: Session Initiation Protocol" IETF RFC 3261, June 2002.

The SIP protocol is a session-based protocol designed to establish IP based communication sessions between two or more end points or users. Once a SIP session has been established, communication between these end points or users can be carried out using a variety of different protocols (for example those designed for streaming audio and video). These protocols are defined in the SIP session initiation messages.

With IMS, users are no longer restricted to a separate voice call or data session. Sessions can be established between mobile devices that allow a variety of communication types to be used and media to be exchanged. The sessions are dynamic in nature in that they can be adapted to meet the needs of the end users. For example, two users might start a session with an exchange of instant messages and then decide that they wish to change to a voice call, possibly with video. This is all possible within the IMS framework. If a user wishes to send a file to another user and the users already have a session established between each other (for example, a voice session) the session can be redefined to allow a data file exchange to take place. This session redefinition is transparent to the end user.

The embodiment uses Internet Standard SIP and IPsec protocols. Each PSD-Hub requires an IP level connectivity to the other PSD-Hubs. A PSD-Hub may be located in a cellular mobile telecommunications network acting as an ISP. However, the implementation is not limited to this particular use case and PSD-Hubs can be operated by parties other than mobile telecommunications network operators on the public Internet. PSD-Hubs solve connectivity problems for devices that are behind NATs and/or separated by different cellular ISP networks. Each PSD-Hub should have at least one Public IP address.

Figure 8:
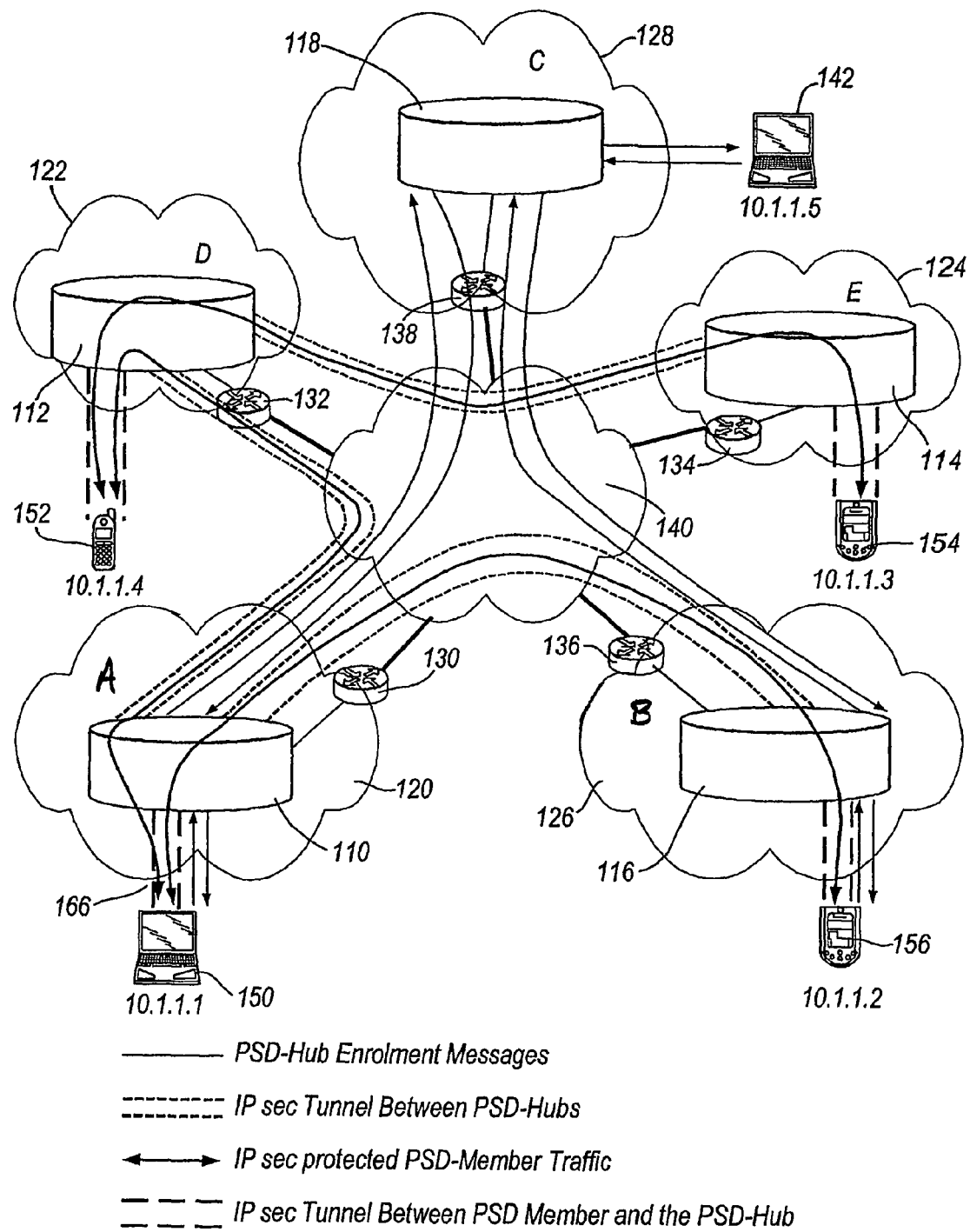
FIG. 8 shows schematically the elements of a system in accordance with an embodiment of the invention, and the signalling between the elements.

FIG. 8 shows a plurality of PSD hubs 110,112,114,116 and 118, each situated in a respective IP network 120,122,124, 126 and 128—in the embodiment cellular IMS (SIP based) networks. The networks 120,122,124,126 and 128 may be operated by respective operators A,B,C,D,E. Each PSD Hub implements IPsec/IKE (Internet Key Exchange) and the proposed Private IP Address Mechanism Section described in the following publication, which is hereby fully incorporated by reference: D. Harkins, D. Carrel: "The Internet Key Exchange (IKE)", RFC 2409, November 1998. Communications between the PSD hubs occur via NATs 130,132,134,136 and 138 and the Internet 140.

If multiple PSD-Hubs are used for connecting PSD member devices, one of PSD-Hubs needs to be nominated as the Controller-PSD-Hub (PSD hub 118 in FIG. 8). The controller-PSD-Hub 118 authenticates the other PSD-Hubs 110,112, 114 and 116 and issues them with PSD-Hub certificates which allow them to authenticate other PSD-Member-Devices and connect to other PSD-Hubs that have already certificates issued for them. The Controller-PSD-Hub is the one with which the PSD-Controller (or administrator) registers. During the formation of the PSD, the PSD controller 142 first registers the PSD-ID with PSD-Hub 18 before it enrols any new members to the PSD. This is not required but increases the security of the architecture as it might be possible for another PSD member to register the same PSD-ID and claim to be the controller. In addition, the PSD-ID registered during the formation might already be used by another PSD and registered to the PSD-Hub 118. If the PSD Controller 142 first registers the PSD-ID it generated before enrolling new members, this issue of colliding PSD-ID and members masquerading to be controllers for registration can be avoided.

During the Controller-PSD-Hub 118 registration the following parameters are passed to the Controller-PSD-Hub 118 by the PSD-Controller 142.

PSD-ID: A Unique 128 bit random number to identify the PSD.

PSD-Member-ID: A Unique 64 bit random number that identifies the PSD-Controller.

Date/Time: Date and Time at which the PSD is registered at.

Controller-PSD-Hub Certificate: This certificate is issued by the PSD-Controller 142 to the PSD-Hub 118 in order to authenticate itself to other PSD-Hubs. It contains a public key generated by the Controller-PSD-Hub 18 prior to creation of the Controller-PSD-Hub Certificate. The corresponding secret key is stored in the Controller-PSD-Hub 18 and is not revealed to the PSD-Controller 42.

PSD-Controller Root Public key: This is the public key of the PSD-controller 142. The corresponding secret key is used to issue PSD-Member-Certificates.

SIP protocol with some extensions can be used to convey this information between the PSD-Controller 142 and the PSD-Hub 118. The PSD-Controller 142 issues the Controller-PSD-Hub certificate after receiving the pubic key of the PSD-Hub 118. Certificate issue mechanisms such as PKCS #10 may be used. Examples of PSD-Hub certificate creation are given below.

PSD-Hub certificates can be created in several ways:
1. PSD member devices can issue a certificate for their PSD-Hub that they are connected to using their secret key portion of their PSD Member Certificate.
2. Operator PSD-Hubs might have a common Certification Authority (CA) and use operator wide certificates to create secure channels between them.
3. Operator PSD-Hubs might already have a secure channel created permanently by operator agreements.

The most generic solution is the first case where any unknown PSD-Hubs can create a secure channel between each other by using certificates. The mechanism to create PSD-Hub Certificates is as follows:

Step 1) The PSD-Controller Device 142 connects to a PSD-Hub 118 in his/her cellular network 128 using his/her subscription to the cellular network 128—for example by means of a key and authentication algorithm present on the SIM/USIM of the controller device 142.

Step 2) A secure IPSec tunnel is created between the PSD-Controller-Device 142 and the PSD-Hub 118.

Step 3) PSD-Controller Device 142 sends the PSD-ID, PSD-Member-ID to the PSD-Hub 118 in order to register the PSD with the PSD-Hub 118.

Step 4) The PSD-Hub 118 searches in its database whether the PSD-ID is already registered (each PSD Hub preferably stores a list of registered PSD-IDs). If the PSD-ID is already registered, the PSD Hub 118 returns back an error message saying the PSD-ID has already been registered. If this is an update of registration for an existing PSD than the PSD-Controller Device 142 will be challenged to produce the PSD-Controller certificate which will be verified using the previously transferred PSD-Controller Root Public key. Updates to the existing registration could be done in terms of removing the registration or updating the certificates for the registrations. Details of these processes are not discussed further here.

Step 5) If the PSD-ID is not previously registered the PSD-Hub 118 accepts the registration and creates an entry in its database for the particular PSD-ID. The PSD-Hub 118 then generates a public and private key pair and sends the public key for certification.

Step 6) Upon receiving an acknowledgement from the PSD-Hub 118 the PSD controller device 142 signs the public key received and creates a Controller-PSD-Hub certificate and attaches the PSD-Controller Root-Public Key in the same message and sends it back the PSD-Hub 118. The Controller-PSD-Hub certificate should not contain a PSD-Member-ID but instead explicitly say that this is a PSD-Hub certificate and can not be used for PSD membership authentication. This ensures that PSD-Hubs can not masquerade as PSD members to other devices in the group. PSD-Hub's functionality is to securely route the IP traffic between PSD Member Devices.

At this stage the Controller-PSD-Hub 118 has been issued a certificate which can then be used to enrol other PSD-Hubs 110,112,114 and 116 to the network of PSD-Hubs. All other PSD-Hub certificates are issued by the Controller-PSD-Hub 118 using private key corresponding to the Controller-PSD-Hub certificate created during the PSD registration.

PSD Member Devices 150,152,154 and 156 authenticate themselves to the PSD-Hubs 110,112,114 and 116 located in their respective cellular operator networks 120,122,124 and 126 using their subscription to the cellular operator.

The PSD controller device 142 and PSD member devices 150,152,154 and 156 may comprise any device having the facility to connect to the relevant cellular network. For example, the devices may be mobile telephones, mobile telephony and enabled PDA, or a computer with a datacard.

Figure 9:
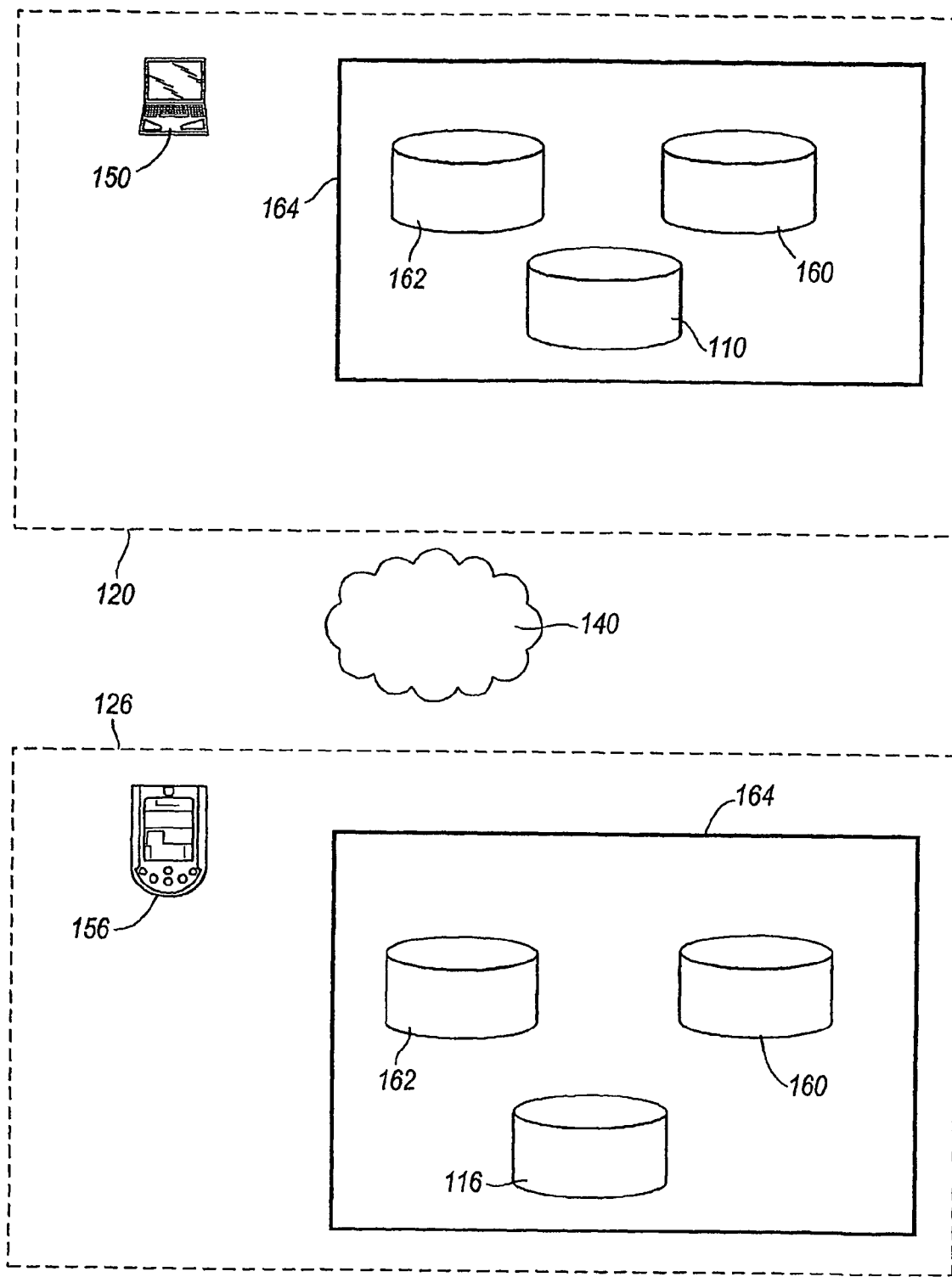
FIG. 9 shows in more detail the elements of two mobile networks between which a PSD is formed.

FIG. 9 shows in more detail the elements for creating a PSD between devices 150 and 156.

The first requirement on the device side is to locate the relevant PSD-Hub in the device's ISP. The address of the PSD-Hub 110 could be given as a SIP address/URL such as PSD-Hub.operator.com. Where operator.com is the Fully Qualified Domain Name (FQDN) of the cellular network 120. An example could be psd-Hub.vodafone.com. This SIP address/URL needs to be configured on the mobile telecommunication enabled device 150 that is subscribed to that particular cellular network 120. This can either be done before the mobile device 150 is sold to the subscriber or can be assigned as a configurable parameter by the cellular network 120 when the mobile device 150 is connected to cellular IP network 120.

The device can then use standard URL to IP address resolution methods such as DNS to derive the actual IP Address of the PSD-Hub inside his/her cellular operator's IP network. Some network interfaces of the PSD-Hub could be a private IP address, meaning it is can not be directly connectable from the public Internet. It can also be a public IP address. The embodiment would work equally in both cases. However, the PSD-Hub does have at least one Public IP address. The rest of the IP addresses it might have could be private. It is very likely that PSD-Hubs in the cellular operators will have multiple Interfaces with at least one private and one public IP addresses.

In FIG. 9 the connection between the device 150 and the PSD-Hub 110 is performed as follows. A SIP proxy server 160, SIP registrar server 162 and the PSD-Hub 110 are implemented as application servers in IMS core 64. The device 150 indicates by a wireless transmission in the packet switched domain to the SIP proxy server 160 that it wishes to communicate with the PSD-Hub 110, and sends the SIP-ID of the PSD-Hub 110. The SIP proxy server 160 then obtains the IP address of the PSD-Hub 110 from the SIP registrar server 162. The SIP proxy server 160 then transmits the IP address to device 150.

The PSD-Hubs 110 and 116 are implemented as an application servers that reside in an IMS (IP Multimedia Subsystem) cores 164 where the user is authenticated using his/her subscription details stored in the smartcard (SIM/USIM applications) in his/her mobile telecommunication device 150,156.

For example, the PSD-Hubs 110 and 116 may perform a challenge and response session with the SIM/USIM. For example PSD-Hub 110 will send a random challenge to the SIM/USIM. The SIM/USIM responds by encrypting the random challenge using both an authentication algorithm and a unique key Ki resident within the SIM and assigned to that particular subscriber. The response is transmitted to the PSD-Hub 110. The PSD-Hub 110 analyses the response to determine whether it is the response that would be expected from that subscriber's SIM. If the response is as expected, then the PSD-Hub 110 considers to device 150 to be authenticated (and likewise for PSD Hub 116 and device 156).

After the authentication to the PSD-Hubs 110 and 116, devices 50 and 56 then run IKE (Internet Key Exchange) protocol to create an IPsec tunnel 166 (FIG. 8) to the PSD-Hub using the same subscription information used in the authentication scheme. These mechanisms are already defined in the 3GPP standards and the details of these mechanisms are not repeated here. Whichever mechanism is used, the PSD member devices 50 and 56 should securely authenticate and create an IPsec tunnel to their respective PSD-Hubs 10 and 16 using their cellular network subscription and be charged depending on their cellular network operators charging policy for PSD-Hub usage.

Alternatively, if any PSD-Hubs are located on the Internet and operated by parties other than mobile network operators, then a similar model of subscription needs to be established where users can be authenticated and an IPsec tunnel can be established between the PSD member device and the PSD-Hub.

During the formation of the PSD, each member device can advertise to the other members the SIP-ID/URL of the PSD-Hub they are most likely to use. This message will be carried using the Service Location Protocol (SLP). This is not essential but would increase the efficiency of the procedure. We describe a way using SIP for one device to locate the PSD-Hubs to which other member devices are connected. This is not essential. However, the PSD-Controller should advertise the PSD-Hub (Controller-PSD-Hub 118) with which it will register the PSD.

It is possible to enrol more PSD-Hubs for a particular PSD during the lifetime of the PSD.

In order to create a secure channel between two PSD-Hubs 110 and 116 located in different cellular networks 120 and 126, PSD-Hub certificates are used.

The process of enrolling other PSD-Hubs with the help of Controller-PSD-Hub 118 will now be described:

A PSD Member device 150 that is connected to network 120 wishes to communicate to another PSD member device 156 in the PSD that is connected to another network 126. The Controller-PSD-Hub 118 is also located in another network 128. The following procedure is followed, the data exchanges being shown in FIGS. 10,11A and 11B.

Step 1) A (device 150) sends a SIP INVITE message 70 in order to establish a session with B (device 156) using the SIP Address of B. The SIP Address of B should be recorded by A during the formation of the PSD. Alternatively, A can ask the PSD-Controller device 142 for a list of members and their SIP Addresses if PSD-Controller device 142 is online. Details of this process are not described further here. It is assumed that A and B know each other's SIP Addresses using some defined PSD procedure. One simple way to achieve this would be to use the MSISDN (telephone number) of B and use ENUM mechanism to convert this to a SIP Address.

Step 2) SIP Proxies 160 located inside the cellular networks 20 and 26 of A and B will route the INVITE message 70 to B. In the body of the INVITE message (using Session Description Protocol (SDP) extensions) A will include the URL for PSD-Hub 110 (PSD-Hub-A) so that B can instruct his PSD-Hub 116 (PSD-Hub-B) to establish a secure link with PSD-Hub-A. SDP is described in the following publication, which is hereby fully incorporated by reference: M. Handley, V. Jacobson, "SDP: Session Description Protocol", IETF RFC 2327, April 1998.

Step 3) B will accept the SIP INVITE and send SIP-200 OK message 72 back to A. The message 72 will contain the URL for PSD-Hub-B.

Step 4) Upon receiving 200-OK message 72 from B, A sends a SIP ACK message 74 complete the session establishment. At this stage both A and B know the address of each other's PSD-Hubs and the Controller-PSD-Hub 118 (as part of PSD establishment performed earlier).

Step 5) Both A and B send a SIP INVITE message 76 to the PSD-Hubs 110 and 116 (PSD-Hubs A and B) in their own networks 120 and 126 indicating that they wish to establish a secure channel with each other. The SIP INVITE messages 76 will also include the URL for the Controller-PSD-Hub 118.

Figure 10:
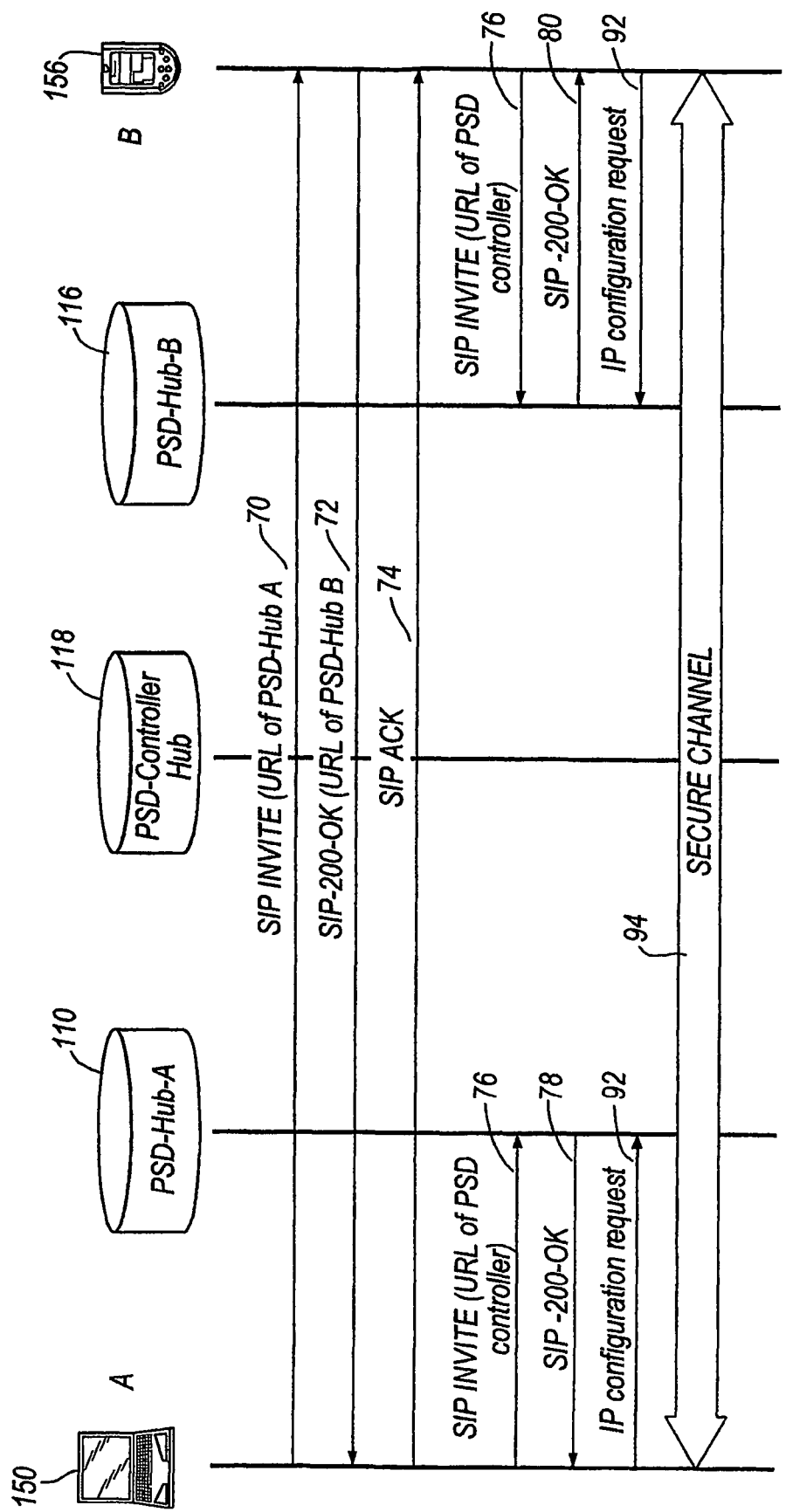
Figure 11B:
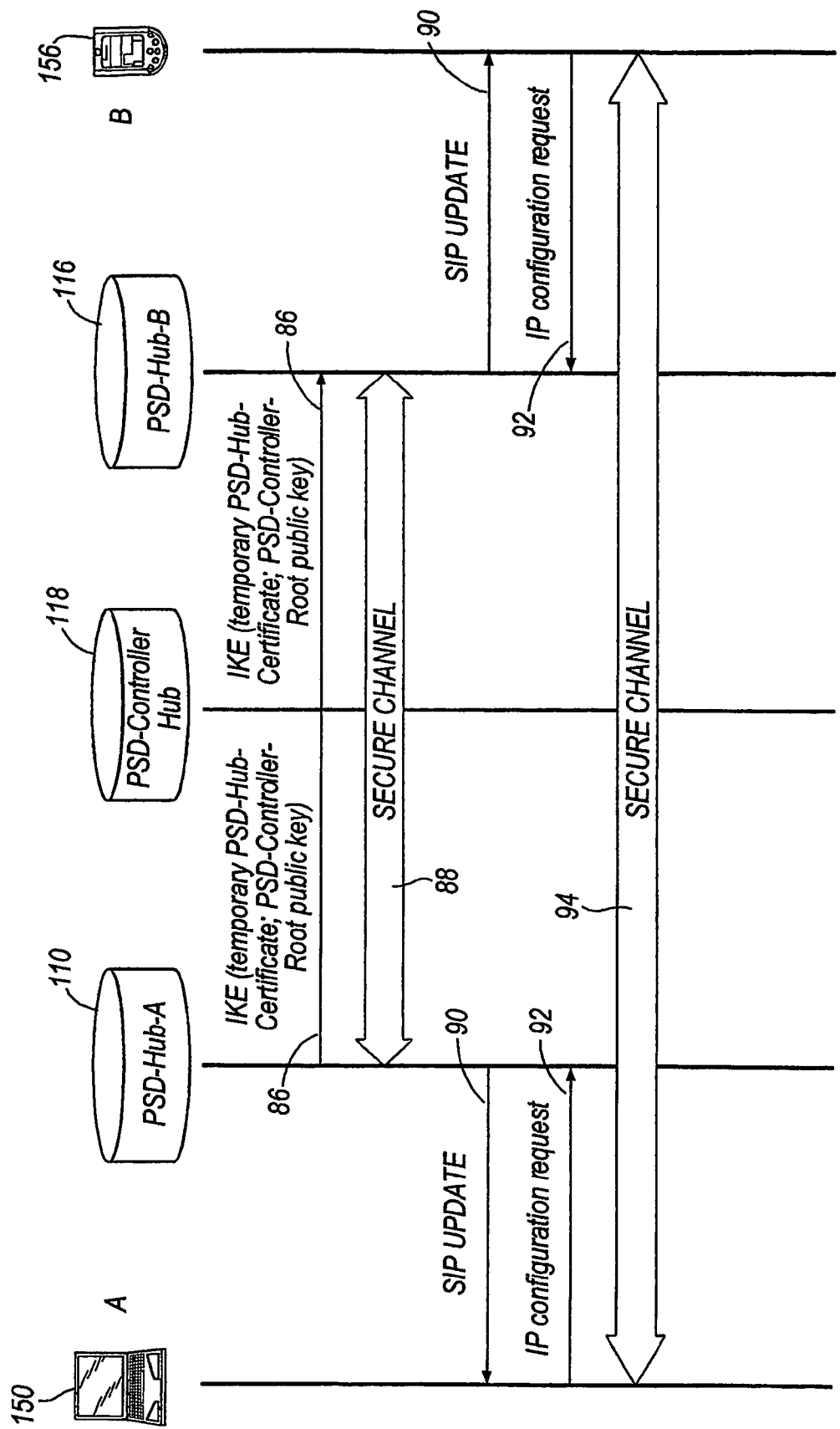

Step 6) Upon receiving the SIP INVITE message 76, PSD-Hub-A checks whether a secure connection exists between PSD-Hub-A and PSD-Hub-B. If such a connection exists it will respond to A with SIP-200 OK message 78 and notify using some SDP extensions that such a secure connection exists. If there is a secure connection, the procedure is as shown in FIG. 10, and jumps to Step 12 (below). If there is no existing secure link between two networks 120 and 126, PSD hub A will try to acquire a PSD-Hub certificate using the Controller-PSD-Hub 118, and the procedure is as shown in FIGS. 11A and 11B (and as described below). In this step and the subsequent steps, operations described in respect of PSD-Hub-A are also performed in respect of PSD-Hub-B, although these are not always described for the sake of brevity.

Step 7) If no secure connection exists, PSD-Hub-A generates a public and a private key pair and sends the public key and the PSD-ID to A to get a signature. The data required for this operation is carried using the SIP protocol (SIP 200 OK message 80).

Step 8) Upon receiving the message containing the public key, A checks the PSD-ID and compares it with the PSD-ID it has requested for connection and issues a temporary certificate for PSD-Hub-A. In other words device A uses its private key corresponding to its PSD-Member-Certificate. Device A sends the temporary PSD-Hub-Certificate and its PSD-Member Certificate to PSD-Hub-A using SIP ACK message 82.

Step 9) PSD-Hub-A uses this certificate to authenticate itself to the Controller-PSD-Hub 118. PSD-Hub-A runs the IKE protocol 84 with the temporary Controller-PSD-Certificate and the PSD-Member-Certificate of A (a certificate chain) to authenticate itself. It should be noted that the temporary PSD-HUB-Certificate issued by A and A's PSD-Member Certificate can be authenticated by the Controller-PSD-Hub 118 using the PSD-Controller Root public key. IKE protocol can use these certificates with the associated certificate chain leading up to the root key of the PSD-Controller which has been transferred by the controller device 142 to the Controller-PSD-Hub 116. If IKE protocol is successful Controller-PSD-Hub 16 issues (message 86) PSD-Hub-A a permanent PSD-Hub-Certificate signed by the private key of the Controller-PSD-Hub 116 and includes the PSD-Controller-Root Public key that will be used to verify the certificate. PSD-Hub-B performs the same operations described in this step and previous step. At this stage both PSD-Hub-A and PSD-Hub-B have certificates that have a common root key (Controller-PSD-Hub Root Key).

Step 10) PSD-Hub-A and PSD-Hub-B run IKE protocol to set-up a secure channel 88 between them. The secure channel 88 uses IPSec with tunnel mode to tunnel the actual PSD traffic between members A and B.

Step 11) PSD-Hub-A and PSD-Hub-B inform their connected PSD-member-Devices A and B that a secure connection is established by sending SIP UPDATE messages 90 in with some SDP extensions.

Step 12) Once devices A and B receive the confirmation that a secure channel exists between PSD-Hub-A and PSD-Hub-B, they send IP configuration requests 92 to their corresponding PSD-Hubs. PSD-Hubs configure private IP addresses using the algorithm below to the connected PSD member devices A and B.
1) Select 10.0.0.0-10.255.255.255 range for the private IPv4 addresses.
2) Allocate the range as follows: First octet of the IPv4 Address=10 (Fixed).X.Y.Z; where X,Y,Z is calculated as follows.

$$X=[\text{Hash(PSD-ID)}][0, 1, 2 \ldots 7],$$

$$Y=[\text{Hash(PSD-Member-ID)}][7, 8, \ldots 15]$$

$$Z=[\text{Hash(PSD-Member-ID)}][0, 1, 2 \ldots 7]$$

3) Final address IPv4=10.X.Y.Z, optionally with the subnet mask of 255.255.255.0

The algorithm provides the PSD members with unique IP addresses.

A one-way function called Hash is used in the algorithm. The hash function could be an industry standard algorithm such as MD5. MD5 is described in the following publication, which is hereby fully incorporated by reference: R. Rivest, "The MD5 Message Digest Algorithm", April 1992.

The algorithm proposed above could be implemented by DHCP servers that are attached to the PSD-Hubs or could be implemented by the software that generates the PSD-Hub itself.

If PSD member devices are accessed via a NAT, such as a gateway device as described in the applicant's co-pending patent application No. GB0326969.3 filed 19 Nov. 2003 (and from which the present application claims priority—the priority documents being filed simultaneously with the present application), then the value "Y" above may be instead calculated as follows.

$$Y=[\text{Hash(PSD-Gateway-ID)}][7, 8, \ldots 15]$$

The modified algorithm creates one subnet per gateway device, so that PSD members can use a "normal" routing table to decide where to route packets (locally, behind the same gateway, or to remote participant via the hub).

Step 13) PSD-Hubs-A and PSD-Hub-B update their internal routing tables to correctly route all PSD traffic belonging to the relevant PSD-ID to the required PSD-Hubs. As the IP addresses are created according to the specific PSD-ID and IP subnet masks are created to segment the IP network based on the PSD-ID, standard IP routing procedures can be used to create routes between several PSD-Hubs that a particular PSD might span across.

Step 14) When devices A and B successfully connect to their corresponding PSD-Hubs A and B, they should register to their operator SIP proxy server 160 the IP address of the PSD-Hub they are connected. This will ensure that when a connection to these devices are required, the operator SIP servers can route the traffic to the PSD-Hubs to which they are attached. The PSD-Hubs A and B themselves will implement a SIP proxy functionality which will automatically register all devices that are connected to themselves. Once a message is received from the network operator SIP server for one of the devices A or B attached, it will route the message to the correct recipient using its own proxy functionality and the private IP address it has assigned to the device A or B attached.

Step 15) After the registration of their current location to their operator SIP Servers, A and B run IKE protocol between each other to create an End-to-End secure channel 94 between them. They use their PSD-Member-Certificates in the IKE protocol. PSD-Hubs A and B will route the traffic between devices A and B. Once IKE is successful devices A and B will protect all traffic between them using IPsec (with ESP) in transport mode. Although PSD-Hubs A and B route the actual traffic between devices A and B they will not have access to the actual contents of the traffic as it will be protected End-to-End. This will prevent rouge PSD-Hubs A and B from eavesdropping on PSD communications. The main purpose of PSD-Hubs is to securely route the traffic between them.

It is also possible to implement an Ad-Hoc PSD model, without a PSD controller, using PSD-Hubs. In this case any PSD member can enrol its own PSD controller to the actual PSD without the need for a controller-PSD-Hub. The enrolment process could be done using a web front-end for each PSD-Hub where a simple password and a PSD-ID is required for enrolling PSD-Hubs to the A-Hoc PSD created. Although this scheme is much simpler and easy to operate it may not be suitable for some PSDs where higher security requirements exist. However, for PSDs where no such requirements exist, this scheme could be preferred.

It should be noted that any PSD-Hub can be added/removed by the controller-PSD-Hub if the member devices move between different PSD-Hubs during the lifetime of the actual PSD created.

In cases where not all members are connected through the PSD-Hubs, SIP proxies 160 in the cellular networks will route the requests to the PSD-Hub to which the PSD-Members are attached. As mentioned above, all PSD member devices that are connected to a PSD hub are required to register to their SIP proxies 160 the IP address of the PSD-Hub to which they are connected. Once requests are routed to the correct PSD-Hub the PSD-Hub will use its own SIP proxy functionality to internally route the request to the correct PSD-Member device.

In FIG. 8 PSD-Hub-112 and PSD-Hub-114 do not go through the enrolment process as they have already have secure links between them. Any two PSD-Member devices can use their associated PSD-Hubs to create a secure routing link between their operator networks for PSD traffic. If all N PSD-Members are behind N different PSD-Hubs then in theory N(N−1)/2 secure links are required to create a virtual PSD network where all members can be connected through PSD-Hubs.

PSD Hubs in the embodiment have the following advantages compared to current IPSec based VPNs.
1) PSD-Hubs support secure dynamic group formation compared to a single group in VPNs.
2) Several isolated groups can be connected to the same PSD-Hub without any traffic mix between them. Same PSD-Hub device can be used between different groups that do not share any common association between them.
3) The embodiment allows an interconnection scheme to link several PSD Hub devices.
4) The embodiment allows mechanisms to locate members of the same group regardless of whether they are connected to the PSD-Hub or outside the PSD-Hub.

The invention claimed is:

1. A system including:
   plurality of devices;
   an administration entity for allowing selected devices to be associated together as a group by providing each device with security data and identification data, the security data of each device being interpretable by each other device within the group, particular modes of communication only being allowed between devices within the group having such security data, and the identification data identifying each device within the group for the purpose of delivering data to that device but not necessarily being recognisable by other devices not in said group; and
   a plurality of hubs, each having an external identifier recognisable by others of said hubs for routing communications between respective ones of the hubs via a communication medium,
   wherein a first of said hubs is operable to communicate data, originating from one device within said group and destined for another device within said group, via said communication medium to a second of said hubs by means of the external identifier of the second of said hubs, the second of said hubs being operable to route the data to said another device within said group using the identification data of said another device;
   wherein at least one of the devices comprises a mobile telecommunications terminal and is operable to communicate with an associated one of the hubs via a mobile telecommunications network;
   wherein the associated one of the hubs includes means for authenticating the mobile terminal; and
   wherein the authenticating means is operable to authenticate the mobile terminal using data relating to the subscription of the mobile terminal with the mobile telecommunications network.

2. The system of claim 1, wherein the first of said hubs and the second of said hubs are operable to route said data securely therebetween via said communication medium.

3. The system of claim 1, wherein the hubs are operable to exchange external identifiers therebetween.

4. The system of claim 1, including means for generating an IP address for enabling communications to be routed between respective ones of the hubs.

5. The system of claim 1, wherein the data is transmitted by IPsec.

6. The system of claim 1, wherein the external identifier is a unique public IP address or telephone number.

7. The system of claim 1, wherein the identification data comprises a respective local IP address assigned to each device by the administration entity.

8. The system of claim 1, wherein the mobile telecommunications terminal includes a smart card storing data for exchange with said authentication means.

9. The system of claim 1, wherein the mobile telecommunications network is a GSM network.

10. The system of claim 1, wherein the mobile telecommunications network is a UMTS (3G) network.

11. The system of claim 1, wherein data is exchanged between the mobile telecommunications terminal and the associated one of the hubs by a GPRS link.

12. The system of claim 1, wherein data is exchanged between the mobile telecommunications terminal and the associated one of the hubs using Session Initiation Protocol (SIP).

13. The system of claim 1, wherein each device stores a key.

14. The system of claim 1, wherein the hubs are operable to generate a public-private key pair.

15. The system of claim 14, wherein the device associated with the hub is operable to generate a certificate using the public key of the hub and the device's key.

16. The system of claim 15, wherein the hub is operable to authenticate itself with the administration entity using said certificate.

17. The system of claim 1, wherein the communication medium comprises the Internet.

18. A method of enabling communication between a plurality of devices, the method including associating selected devices together as a group by providing each device with security data and identification data, the security data of each device being interpretable by each other device within the group, particular modes of communication only being allowed between devices within the group having such security data, and the identification data identifying each device within the group for the purpose of delivering data to that device but not necessarily being recognisable by other devices not in said group; providing a plurality of hubs, each having an external identifier recognisable by others of said hubs for routing communications between respective ones of the hubs via a communication medium; and a first of said hubs routing data, originating from one device within said group and destined for another device within said group, via the communication medium to a second of said hubs by means of the external identifier of the second of said hubs, the second said hubs routing the data to said another device within said group using the identification data of said another device, wherein at least one of the devices comprises a mobile telecommunications terminal which communicates with an associated one of the hubs via a mobile telecommunications network, wherein the associated one of the hubs authenticates the mobile terminal; and wherein the mobile terminal is authenticated using data relating to the subscription of the mobile terminal with the mobile telecommunications network.

19. The method of claim 18, wherein the first of said hubs and the second of said hubs route said data securely therebetween via said communication medium.

20. The method of claim 18, wherein respective ones of the hubs exchange external identifiers therebetween.

21. The method of claim 18, wherein the data is transmitted by IPsec.

22. The method of claim 18, including generating an IP address for enabling communications to be routed between respective ones of the hubs.

23. The method of claim 18, wherein the external identifier is a unique public IP address or telephone number.

24. The method of claim 18, wherein the communication medium comprises the Internet.

25. The method of claim 18, wherein the identification data comprises a respective local IP address assigned to each device.

26. The method of claim 18, wherein a smart card associated with the mobile telecommunications terminal stores data to perform said authentication.

27. The method of claim 18, wherein the mobile telecommunications network is a GSM network.

28. The method of claim 18, wherein the mobile telecommunications network is a UMTS (3G) network.

29. The method of claim 18, wherein data is exchanged between the mobile telecommunications terminal and the associated one of the hubs by a GPRS link.

30. The method of claim 18, wherein using Session Initiation Protocol (SIP).

31. The system of claim 18, wherein each device stores a key.

32. The system of claim 18, wherein the hubs generate public-private key pairs.

33. The method of claim 32, wherein the device associated with the hub generates a certificate using the public key of the hub and the device's key.

34. The method of claim 33, wherein the hubs authenticates itself within the group using said certificate.

35. A system comprising:
a plurality of devices;
an administration entity for allowing selected devices to be associated together as a group by providing each device with security data and identification data, the security data of each device being interpretable by each other device within the group, particular modes of communication only being allowed between devices within the group having such security data, and the identification data identifying each device within the group for the purpose of delivering data to that device but not necessarily being recognisable by other devices not in said group; and
a plurality of hubs, each located in a different Internet Service Provider or cellular network and each having an external identifier recognisable by others of said hubs for routing communications between respective ones of the hubs via a communication medium, wherein a first of said hubs is operable to communicate data, originating from one device within said group and destined for another device within said group, via said communication medium to a second of said hubs, by means of the external identifier of the second of said hubs, the second of said hubs being operable to route the data to said another device within said group using the identification data of said another device, wherein said hubs are operable to create a secure channel between the hubs to route said data securely therebetween via said communication medium so as to form a virtual local network for the devices in the group that is only accessible to the devices in the group;
wherein at least one of the devices comprises a mobile telecommunications terminal and is operable to communicate with an associated one of the hubs via a mobile telecommunications network;
wherein the associated one of the hubs includes means for authenticating the mobile terminal; and
wherein the authenticating means is operable to authenticate the mobile terminal using data relating to the subscription of the mobile terminal with the mobile telecommunications network.

36. A method of enabling communication between a plurality of devices, the method including associating selected devices together as a group by providing each device with security data and identification data, the security data of each device being interpretable by each other device within the group, particular modes of communication only being allowed between devices within the group having such security data, and the identification data identifying each device within the group for the purpose of delivering data to that device but not necessarily being recognisable by other devices not in said group; providing a plurality of hubs, each located in a different Internet Service Provider or cellular network and each having an external identifier recognizable by others of said hubs for routing communications between respective ones of the hubs via a communication medium; and a first of said hubs routing data, originating from one device within said group and destined for another device within said group, via the communication medium to a second of said hubs by means of the external identifier of the second of said hubs, the second of said hubs routing the data to said another device within said group using the identification data of said another device, wherein said hubs create a secure channel between the hubs to route said data securely therebetween via said communication medium so as to form a virtual local network for the devices in the group that is only accessible to the devices in the group;
wherein at least one of the devices comprises a mobile telecommunications terminal which communicates with an associated one of the hubs via a mobile telecommunications network;
wherein the associated one of the hubs authenticates the mobile terminal; and
wherein the mobile terminal is authenticated using data relating to the subscription of the mobile terminal with the mobile telecommunications network.

* * * * *

UNITED STATES PATENT AND TRADEMARK OFFICE
CERTIFICATE OF CORRECTION

PATENT NO.        : 8,776,183 B2
APPLICATION NO.   : 10/580297
DATED             : July 8, 2014
INVENTOR(S)       : Chandrasiri et al.

Page 1 of 1

It is certified that error appears in the above-identified patent and that said Letters Patent is hereby corrected as shown below:

Title page, item (73), Assignee, add "Telefonaktiebolgat LM Ericsson, Stockholm, SE"

Signed and Sealed this
Second Day of December, 2014

Michelle K. Lee
*Deputy Director of the United States Patent and Trademark Office*